(12) United States Patent
Grasshoff

(10) Patent No.: US 6,786,681 B2
(45) Date of Patent: Sep. 7, 2004

(54) METHOD AND APPARATUS FOR THE PNEUMATIC CONVEYING OF FINE BULK MATERIAL

(75) Inventor: Herbert Grasshoff, Moers (DE)

(73) Assignee: Bayer Aktiengesellschaft, Leverkusen (DE)

( * ) Notice: Subject to any disclaimer, the term of this patent is extended or adjusted under 35 U.S.C. 154(b) by 64 days.

(21) Appl. No.: 10/160,889

(22) Filed: Jun. 3, 2002

(65) Prior Publication Data

US 2002/0187012 A1 Dec. 12, 2002

(30) Foreign Application Priority Data

Jun. 6, 2001 (DE) .......................................... 101 27 427

(51) Int. Cl.[7] .............................................. B65G 51/16
(52) U.S. Cl. .............................. 406/11; 406/15; 406/95; 406/127; 406/151
(58) Field of Search ............................... 406/11, 15, 50, 406/95, 151, 127, 192

(56) References Cited

U.S. PATENT DOCUMENTS

| | | | |
|---|---|---|---|
| 3,260,541 A | 7/1966 | Sadler et al. | |
| 3,273,508 A | 9/1966 | Lung | |
| 3,304,127 A | 2/1967 | Huffaker | 302/28 |
| 3,468,169 A | 9/1969 | Welch | |
| 3,537,755 A * | 11/1970 | Schmidt | 406/95 |
| 3,671,079 A * | 6/1972 | Huffaker | 406/137 |
| 4,599,017 A * | 7/1986 | Russemeyer et al. | 406/95 |
| 4,715,748 A * | 12/1987 | Krambrock | 406/11 |
| 4,861,200 A * | 8/1989 | Lubbehusen et al. | 406/14 |
| 4,909,676 A * | 3/1990 | Heep et al. | 406/14 |
| 5,240,355 A | 8/1993 | Hudalla | 406/95 |
| 5,562,366 A * | 10/1996 | Paulson | 406/12 |
| 5,584,612 A * | 12/1996 | Nolan | 406/11 |
| 5,775,851 A * | 7/1998 | Waeschle et al. | 406/14 |
| 6,106,202 A | 8/2000 | Nolan | 406/95 |
| 6,287,056 B1 * | 9/2001 | Szikszay | 406/197 |
| 6,386,800 B1 * | 5/2002 | van Eyck | 406/95 |
| 6,508,610 B2 * | 1/2003 | Dietrich | 406/13 |

FOREIGN PATENT DOCUMENTS

| | | |
|---|---|---|
| DE | 3002143 A1 | 7/1981 |
| EP | 0 692 441 | 1/1996 |
| EP | 0936128 A1 | 8/1999 |
| EP | 0947718 A | 10/1999 |

* cited by examiner

Primary Examiner—Joe Dillon, Jr.
(74) Attorney, Agent, or Firm—Godfried K. Akoril; Diderico van Eyl

(57) ABSTRACT

A method and an apparatus for the pneumatic conveying of fine bulk material, in particular glass fibers. The apparatus includes (i) a pneumatic conveying pipe having an upstream first portion, a downstream second portion, and a discharge point located further downstream from second portion; (ii) a charging container that is in reversibly closeable communication with a charging point of pneumatic conveying pipe, charging point being located further upstream from first portion; (iii) a suction conveying device which is in reversibly closeable gaseous communication with a suction point located between first and second portions of pneumatic conveying pipe; (iv) a pressure conveying device that is in reversibly closeable gaseous communication with a portion of pneumatic conveying pipe at a point that is further upstream from charging point; (v) a conveying supplementary line having a closed end or a reversibly closeable end, pressure conveying device being in reversibly closeable gaseous communication therewith; and a plurality of shut-off devices providing reversibly closeable gaseous communication from conveying gas supplementary line into pneumatic conveying pipe.

18 Claims, 1 Drawing Sheet

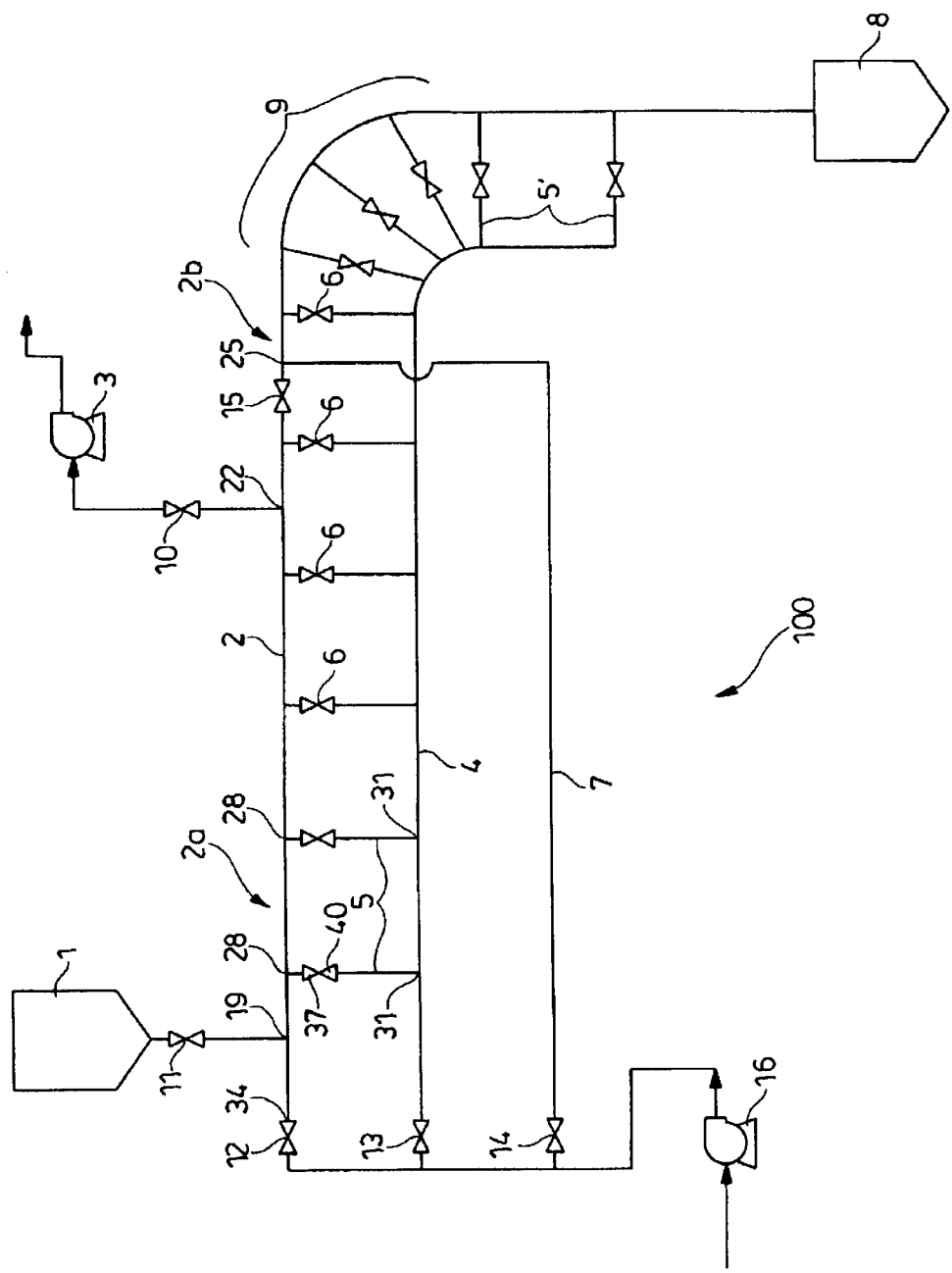

METHOD AND APPARATUS FOR THE PNEUMATIC CONVEYING OF FINE BULK MATERIAL

CROSS REFERENCE TO RELATED PATENT APPLICATION

The present patent application claims the right of priority under 35 U.S.C. §119 (a)–(d) of German Patent Application No. 101 27 427.9, filed Jun. 6, 2001.

FIELD OF THE INVENTION

The invention relates to a method and an apparatus for the pneumatic conveying of fine bulk material, in particular glass fibers.

BACKGROUND OF THE INVENTION

Background art: glass fibers are used in large quantities for manufacturing plastics material—especially for manufacturing glass-fiber-reinforced plastics materials. In said case, a considerable outlay is necessary for handling the glass fibers, especially for transport and charging of the production installations. The space required for storage of the glass fiber bunches can be considerable.

Glass fibers are usually processed in the form of fiber bundles. The fiber bundles are composed of a number, e.g. 2000, parallel individual fibers having a typical length of around 4.5 mm.

Currently known conveying techniques for the intermittent charging/filling of production installations with cut glass fibers include elevator installations, industrial trucks such as fork lift trucks or crane installations.

Continuous conveying may be effected by means of, for example, bucket conveyors, continuous handling equipment, shaking or vibrating chutes or conveyor belts.

The drawback is that some of these conveying techniques are very elaborate and, because of their shape and spatial requirement, may be integrated only with difficulty into existing production facilities.

An alternative to these approaches may be offered by the use of pneumatic conveying installations. However, the operation of pneumatic conveying installations for conveying cut glass fibers presents various problems with regard to quality assurance and operational reliability.

With pneumatic airborne conveying, all of the bulk material particles or glass fibers in the form of fiber bundles move in approximate uniformity over the pipe cross section. In said case, particles having sizes above approximately 1 mm collide with one another and with the pipe walls, which leads to transverse movements and rotation of the particles. In the case of smaller particles, the transverse movements are caused by the turbulence of the air flow. The high conveying speed—the flow is generally turbulent—leads to considerable abrasion of the glass fiber bundles. The fiber bundles are undesirably partially broken up and ground into glass wadding and so may not be processed any further. A further undesirable outcome is that the conveying pipes may become clogged with glass fibers.

With pneumatic low-speed conveying, whereby the glass fibers are conveyed typically at speeds equal to or lower than 5 m/s, the comparatively lower speed leads to a partial deposit of glass fibers in the horizontal pipe. The resulting flow form is skein conveying. The deposited fiber fraction at the bottom of the pipe continues to be conveyed more or less quickly in the form of skeins. A further lowering of the conveying speed leads to a dune-like conveying of the deposited fibers and/or to conveying in plugs, which may fill the entire pipe cross section.

Given the use of pressure dispatchers (i.e., a pressure feed for charging glass fiber portions) for slow-speed conveying in the pipe system, the outlet region of the pressure dispatcher becomes clogged with the cut glass fibers.

In the case of conveying of the glass fibers by means of cellular wheel sluices as metering hoppers into the pipe system, in which the pneumatic conveying is effected, the cellular wheel sluice serving as the metering element may itself lead to the destruction of the cut glass fibers. This leads to blocking of the cellular wheel sluice by the glass fibers, which collect between rotor and stator of the cellular wheel.

Methods of effecting the low-speed conveying of bulk materials which are difficult to handle or require gentle handling, such as suction conveying using supplementary air valves or pressure conveying with supplementary lines, which carry pure gas and have an elastic inner pipe, alter the cut glass fibers too much at a high conveying speed on account of impact and friction between the glass fibers themselves and between the glass fibers and the conveying installation, e.g., a pipe. This leads to disintegration of the fiber bundles.

As a result of abrasion of the feed material the pneumatic conveying system is ground through. Known installations or materials for conveying systems are therefore operationally unreliable and too maintenance-intensive. There is also the possibility of the glass fibers being damaged during transport.

Thus, with the described conveying systems according to prior art it is not possible to achieve a satisfactory charging of the production plant with cut glass fibers, which is notable for high operational reliability, low operating costs (wear, handling) and gentle handling of material (quality assurance).

SUMMARY OF THE INVENTION

The object of the present invention is to provide an apparatus and a method of pneumatically conveying cut glass fibers, which is operationally highly reliable, low-maintenance and easy to operate and operates in a way that handles the material gently.

In accordance with the present invention, there is provided an apparatus comprising:

(i) a pneumatic conveying pipe (2) having upstream and downstream portions, said pneumatic conveying pipe having a first portion (2a) which is located upstream from a second portion (2b), and a discharge point (8) located further downstream from said second portion (2b);

(ii) a charging container (1) that is in reversibly closeable communication with a charging point (19) of said pneumatic conveying pipe (2), said charging point (19) being located further upstream from said first portion (2a) of said pneumatic conveying pipe (2);

(iii) a suction conveying device (3) which is in reversibly closeable gaseous communication with a suction point (22) of said pneumatic conveying pipe (2), said suction point (22) being located between said first (2a) and second (2b) portions of said pneumatic conveying pipe (2);

(iv) a pressure conveying device (16) that is in reversibly closeable gaseous communication with a portion of said pneumatic conveying pipe (2) at a point (34) that is further upstream from said charging point (19);

(v) a conveying gas supplementary line (4) having one of a closed end and a reversibly closeable end, said pressure conveying device (16) being in reversibly closeable gaseous communication with said conveying gas supplementary line (4); and (vi) a plurality of shut-off devices (6) providing reversibly closeable gaseous communication from said conveying gas supplementary line (4) into said pneumatic conveying pipe (2).

In accordance with the present invention, there is also provided a method of pneumatically conveying a fine bulk material. The method comprises:

(a) providing the apparatus as described above;

(b) filling, in a first step, said first portion (2a) of said pneumatic conveying pipe (2) with a fine bulk feed material from said charging container (1) through said charging point (19) by means of said suction charging device (3) drawing said fine bulk feed material into said first portion (2a) of said pneumatic conveying pipe (2);

(c) transferring, in a second step, the fine bulk feed material from said first portion (2a) to said second portion (2b) of said pneumatic conveying pipe (2), by means of said pressure conveying device (16) which introduces conveying gas into said pneumatic conveying pipe (2); and (d) conveying, in a third step, the fine bulk feed material from said second portion (2b) of said pneumatic conveying pipe (2) to said discharge point (8), by means of said pressure conveying device (16), wherein each of said second portion (2b) of said pneumatic conveying pipe (2) and said conveying gas supplementary line (4) are provided with a constant quantity of conveying gas.

The features that characterize the present invention are pointed out with particularity in the claims, which are annexed to and form a part of this disclosure. These and other features of the invention, its operating advantages and the specific objects obtained by its use will be more fully understood from the following detailed description and the accompanying drawings in which preferred embodiments of the invention are illustrated and described.

Other than in the examples, or where otherwise indicated, all numbers or expressions, such a those expressing structural dimensions, etc, used in the specification and claims are to be understood as modified in all instances by the term "about."

BRIEF DESCRIPTION OF THE DRAWING FIGURE

FIG. 1 is a schematic representation of an apparatus (100) according to the present invention.

DETAILED DESCRIPTION OF THE INVENTION

As a charging container (1), containers, BIG-BAGs (fabric containers), silos, hoppers, storage spaces, boilers, lorry trailers or other containers are suitable examples.

The pneumatic conveying pipe (2) is preferably a pipe having a nominal diameter of 100 to 200 mm and a length of 10 to 200 m or more, which is preferably made of fully hardened steel. It is particularly preferred when the conveying pipe at the inner wall has a hardness of 50 to 90 HRC, in a particularly preferred manner 60 to 65 HRC. The conveying pipe is preferably composed of various segments, which are connected e.g. by flanged joints. For gentle handling of the fibers, it is particularly important to ensure a run of the conveying pipe which is free of forward and backward projections.

As a suction conveying device (3), any machines for generating a vacuum for gases are suitable. Preferably, a blower or a fan is used.

Both the first (2a) and the second (2b) portions of the pneumatic conveying pipe (2) as well as the conveying gas supplementary line (4) are preferentially connected by a pipeline (e.g., a header) to a conveying gas supply (16), which is provided at the desired admission pressure. As a pressure conveying device (16), any machines for generating pressure above atmospheric for gases are suitable. Preferably, a blower, a fan, a condenser or a compressor is used.

In principle, as a conveying gas supplementary line (4), any simple pipeline is suitable, which may likewise preferably be composed of various segments, which are connected by, for example, flanged joints. The conveying gas supplementary line (4) at the end is closed or reversibly closeable so as to allow pressure to build up therein.

The conveying pipe (2) and the conveying gas supplementary line (4) are connected to one another by, for example, short pipe pieces. The pipe pieces carry the shut-off devices (6).

The discharge point (8) may, for example, be used only for storage or metering purposes or already be an actual apparatus for further processing of the fine bulk material. It may be, for example, the feed for an extruder. As a discharge point (8), in principle all receptacles or containers, such as BIG-BAGs (fabric containers), silos, hoppers, storage spaces, boilers, lorry trailers, reaction or further processing vessels, extruders or other receptacles and apparatuses are suitable.

In a preferred embodiment of the apparatus (100), the shut-off devices (6) are of a two-stage design, wherein the first stage, which is connected to the conveying pipe, is designed to safeguard against blowback in the event of increased pressure in the conveying pipe (2). More particularly, each shut-off device (6) has a gaseous connection point (28) with the pneumatic conveying pipe (2) and a gaseous connection point (31) with the conveying gas supplementary line (4). Each shut-off device (6) further has a two-stage design comprising a first stage (37) that is proximate to the pneumatic conveying pipe connection point (28), and a second stage (40) that is proximate to the conveying gas supplementary line connection point (31). The first stage of the shut-off device (6) reversibly closes when the pressure in the pneumatic conveying pipe (2) at the connection point (28) of the shut-off device therewith is equal to or greater than the pressure in the conveying gas supplementary line (4) at the connection point (31) of the shut-off device therewith. The first stage of the shut-off device thus prevents blowback from the pneumatic conveying pipe (2) into the conveying gas supplementary line (4) through the shut-off device (6).

In a preferred embodiment of the apparatus, shut-off devices are of a two-stage design, wherein the second stage (40), which is connected to the conveying gas supplementary line (4), is designed as an inlet valve with pressure presetting for the conveying of gas from the conveying gas supplementary line (4) into the pneumatic conveying pipe (2).

In a preferred embodiment of the apparatus, the distance between the gaseous connection points (28) of each adjacent shut-off device (6) with the pneumatic conveying pipe (2) is from 200 mm to 2000 mm.

In a preferred embodiment of the apparatus (100), the pressure conveying device (16) is connected, such that it may be reversibly shut off, to the conveying gas supplementary line (4).

In a preferred embodiment of the apparatus (100), the pressure conveying device (16) is connected, such that it may be reversibly shut off, to the start of the second portion (2b) of the conveying pipe (2).

In a preferred embodiment of the apparatus (100), a shut-off device (15), in particular a pinchcock, is disposed between the first portion (2a) of the conveying pipe (2) and the second portion (2b) of the conveying pipe (2).

In a preferred embodiment of the apparatus (100), a shut-off device (11), in particular a pinchcock, is disposed between the charging container (1) and charging point (19), which is positioned upstream from the first portion (2a) of the conveying pipe (2).

Both the discharge point (8), the charging point (19) and the suction (3) and pressure conveying (16) devices may be provided independently of one another with a filtration unit to prevent pollution of the environment (e.g., with glass fiber dust). For such a purpose, use is typically made of self-dedusting filter devices.

In the method of the present invention, by keeping the conveying gas quantity constant, wear-inducing conveying speeds are substantially avoided. Empty pipe speeds of 2 m/s to 8 m/s, preferably of 4 to 5 m/s, have proved particularly suitable for conveying cut glass fibers in the present invention.

The method is preferably effected in such a way that the first step, i.e., filling of the first portion (2a) of the pneumatic conveying pipe (2), is implemented when the second step, i.e., pressure conveying of the feed material out of the first portion (2a) into the second portion (2b) of the conveying pipe (2), is concluded. Consequently, the first step of a conveying cycle and the third step of the next conveying cycle, i.e., pressure conveying of the feed material in the second portion (2b) of the feed material to the discharge point (8), may be implemented simultaneously. By a "conveying cycle," in the present invention, is meant the sequence of the above three steps.

A variant of the method is preferred, in which at those points (9) of the conveying pipe (2) susceptible to clogging, the occurrence of clogging is minimized or prevented by means of an increased number of shut-off devices in that the shut-off devices installed at said points open in the event of pressure loss in this region of the conveying pipe, and introduce conveying gas into the region of incipient clogging.

In the event of incipient clogging, the pressure in the conveying line (2) increases upstream of the incipient clogging. Consequently, the pressure in the conveying gas supplementary line (4) likewise increases until the shut-off devices downstream of the incipient or already existing clogging open and the incoming conveying gas maintains the conveying of the material downstream of the incipient or already existing clogging. At the same time, the incoming conveying gas breaks up and eliminates the clogging.

A variant of the method is preferred, in which use is made of shut-off devices, which are of a two-stage design, wherein the first stage, which is connected to the conveying pipe, safeguards against blowback and closes when the pressure in the pneumatic conveying pipe is equal to or greater than the pressure in the conveying gas supplementary line.

Equally preferred is a variant of the method, in which use is made of shut-off devices, which are of a two-stage design, wherein the second stage, of the device which is connected to the conveying gas supplementary line, is designed as an inlet valve with a pressure preset for the conveying gas from the conveying gas supplementary line, in this method a pressure is preset, at the second stage which is greater than the pressure at the connection point in the conveying pipe during clogging-free operation of the conveying pipe.

The preset pressure is preferably 5–70% greater, in a particularly preferred manner 20–50% greater than the pressure at the appropriate point in the conveying pipe during clogging-free operation of the conveying pipe.

Equally preferred is a variant of the method, in which the pressure in the second stage of the shut-off devices is preset so as to increase in conveying (or downstream) direction from shut-off device to shut-off device. More particularly, the second stage of each downstream shut-off device is preset to introduce gas into the pneumatic conveying pipe at a pressure greater than each adjacent upstream shut-off device.

A variant of the method is preferred, in which use is made of a conveying pipe, which is connected to the conveying gas supplementary line by a plurality of shut-off devices at intervals of 200 mm to 2000 mm. More particularly, the distance between the gaseous connection points (28) of each adjacent shut-off device (6) with the pneumatic conveying pipe (2) is from 200 mm to 2000 mm.

A variant of the method is preferred, in which the feed material is cut glass fibers in fiber bundles. The typical length of the glass fiber is 3 to 6 mm, the diameter is in particular from 5 $\mu$m to 50 $\mu$m. A fiber bundle usually has a rectangular cross section which is, for example, 1 mm high and 3 mm wide.

In an embodiment of the present invention, the pneumatic conveying pipe (2) of the apparatus (100) includes a clog-prone portion (9) that resides within said second portion (2b) of the pneumatic conveying pipe (2). The clog-prone portion (9) is provided with an increased number of shut-off devices (6) relative to the rest of the pneumatic conveying pipe (2). The increased number of shut-off devices reversibly open and allow conveying gas to be introduced from conveying gas supplementary line (4) into the clog-prone portion (9) when a drop in pressure in the clog-prone portion (9) is detected.

In a preferred embodiment of the present invention, the apparatus (100) further comprises a by-pass pipe (7) that provides reversibly closeable gaseous communication between the pressure conveying device (16) and a by-pass pipe connection point (25) in the pneumatic conveying pipe. The by-pass pipe connection point (25) is located downstream from the first portion (2a), upstream from the second portion (2b) of the pneumatic conveying pipe (2), and downstream from suction point (22) and in-line valve (15). Gaseous flow through the by-pass pipe is typically shut off during the first and second steps of the process of the present invention. Preferably, in the third step of the method of the present invention, gaseous flow from the first portion (2a) into the second portion (2b) of the pneumatic conveying pipe (2) is shut off, e.g., by means of in-line valve (15), and gaseous flow from the pressure conveying device (16) is allowed to flow through the by-pass line (7) and into second portion (2b), thereby conveying the fine bulk feed material from second portion (2b) of pneumatic conveying pipe (2) to discharge point (8).

As a conveying gas, preferably compressed air, in particular dried compressed air, is used.

The effect achieved by the method according to the invention is that fine bulk materials, which suffer damage under load, may be conveyed pneumatically without quality impairment. The method is rugged and inexpensive. Also, because high conveying speeds are avoided, abrasion of the conveying system is low.

The invention is now described in detail by way of example and with reference to the accompanying drawing, without however the invention being limited to the details thereof.

EXAMPLES

In FIG. 1 an installation (100) for pneumatically conveying cut glass fibers is diagrammatically illustrated. The glass fibers take the form of a flock of around 2000 fibers, which is 4.5 mm long and has a diameter of around 0.5 mm. The individual fiber diameter is around 5 µm.

The cut glass fibers to be conveyed are situated in the charging container 1. All of the stop-cocks (e.g., 10, 11, 12, 13, 14 and 15) are closed. In a first step, the stop-cocks (10) and (11) are opened, and by means of the blower (3) a portion of about 150 kg of the cut glass fibers is sucked within 1 minute from the charging container (1) into the first portion (2a) of the pneumatic conveying pipe (2). The stop-cocks (10) and (11) are then closed.

In a second step, the stop-cocks (12), (13) and (15) are opened and the portion of cut glass fibers, which was conveyed in the first step into the first portion (2a) of the conveying pipe (2), is conveyed by the conveying gas within 20 seconds into the second portion (2b) of the conveying pipe (2) by means of pressure conveying. Compressed air is used as a conveying gas. The pressure of the compressed air is built up by the blower (16). The stopcocks (12) and (15) are closed, stop-cock (13) remains open in order to supply the conveying gas supplementary line (4) with compressed air.

In a third step, the stop-cock (14) is opened, and compressed air is allowed to flow through by-pass pipe (7) and into conveying pipe (2) at by-pass pipe connection point (25). The charged portion of cut glass fibers, which was conveyed in the second step into the second portion (2b) of the conveying pipe (2), is then conveyed by the compressed air passing through by-pass pipe (7) into the second portion (2b) of the conveying tube (2) to the discharge point (8). The conveying is effected within 2 minutes. The compressed air quantity is set to 200 m³/h under normal conditions, which corresponds to a gas empty pipe speed of around 5 m/s. The stop-cock (14) is then closed.

In the event of incipient or existing clogging, the shut-off devices (6) open automatically, which are connected in the region of the first portion (2a) of the conveying pipe (2) by short pipe pieces (5) and in the region of the second portion (2b) of the conveying tube (2) by short pipe pieces (5') to the conveying gas supplementary line (4). As a result, the conveying of the charged portion of cut glass fibers is maintained downstream of the incipient or existing clogging. The incoming compressed air from the conveying gas supplementary line (4) loosens and finally eliminates the incipient or existing clogging.

In the clog-prone region (9) of the second portion (2b) of the conveying pipe (2) a bend of the conveying pipe (2) is illustrated as an example of a point where there may be an increased risk of clogging. For said reason, in the clog-prone region (9) the number of shut-off devices (6) per pipe length is increased.

During implementation of the third step of a conveying cycle, the first step of the next conveying cycle may be implemented simultaneously there with.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method of pneumatically conveying fine bulk material comprising:
   (a) providing an apparatus comprising,
      (i) a pneumatic conveying pipe having upstream and downstream portions, said pneumatic conveying pipe having a first portion which is located upstream from a second portion, and a discharge point located further downstream from said second portion,
      (ii) a charging container that is in reversibly closeable communication with a charging point of said pneumatic conveying pipe, said charging point being located further upstream from said first portion of said pneumatic conveying pipe,
      (iii) a suction conveying device which is in reversibly closeable gaseous communication with a suction point of said pneumatic conveying pipe, said suction point being located between said first and second portions of said pneumatic conveying pipe,
      (iv) a pressure conveying device that is in reversibly closeable gaseous communication with a portion of said pneumatic conveying pipe at a point that is further upstream from said charging point,
      (v) a conveying gas supplementary line having one of a closed end and a reversibly closeable end, said pressure conveying device being in reversibly closeable gaseous communication with said conveying gas supplementary line, and
      (vi) a plurality of shut-off devices providing reversibly closeable gaseous communication from said conveying gas supplementary line into said pneumatic conveying pipe;
      (vii) a shut-off apparatus providing gaseous communication from said first portion of said pneumatic conveying pipe to said second portion of said pneumatic conveying pipe;
   (b) filling, in a first step, said first portion of said pneumatic conveying pipe with a fine bulk feed material from said charging container through said charging point by means of said suction charging device drawing said fine bulk feed material into said first portion of said pneumatic conveying pipe;
   (c) transferring, in a second step, the fine bulk feed material from said first portion to said second portion of said pneumatic conveying pipe, by means of said pressure conveying device which introduces conveying gas into said pneumatic conveying pipe; and
   (d) conveying, in a third step, the fine bulk feed material from said second portion of said pneumatic conveying pipe to said discharge point, by means of said pressure conveying device,
   wherein each of said second portion of said pneumatic conveying pipe and said conveying gas supplementary line are provided with a constant quantity of conveying gas.

2. The method of claim 1 wherein a clog-prone portion of said pneumatic conveying pipe that resides within said second portion of said pneumatic conveying pipe is provided with an increased number of said shut-off devices relative to the rest of said pneumatic conveying pipe, said increased number of shut-off devices reversibly opening and allowing conveying gas to be introduced from said conveying gas supplementary line into said clog-prone portion when a drop in pressure in said clog-prone portion is detected.

3. The method of claim 1 wherein each shut-off device has a gaseous connection point with said pneumatic conveying pipe and a gaseous connection point with said conveying gas supplementary line, each shut-off device having a two-stage design comprising a first stage that is proximate to said pneumatic conveying pipe connection point, and a second stage that is proximate to said conveying gas supplementary line connection point, said first stage reversibly closing when the pressure in said pneumatic conveying pipe at the connection point of the shut-off device therewith is equal to or greater than the pressure in the conveying gas supplementary line at the connection point of the shut-off device therewith, said first stage thereby preventing blowback from said pneumatic conveying pipe into said conveying gas supplementary line through said shut-off device.

4. The method of claim 3 further including presetting a pressure in an inlet valve of the second stage of said shut off valve conveying gas from said gas supplementary line into said pneumatic conveying pipe.

5. The method of claim 4 wherein the second stage of each downstream shut-off device is preset to introduce gas into said pneumatic conveying pipe at a pressure greater than each adjacent upstream shut-off device.

6. The method of claim 3 wherein the distance between the gaseous connection points of each adjacent shut-off device with said pneumatic conveying pipe is from 200 mm to 2000 mm.

7. The method of claim 1 wherein said fine bulk material is cut glass fibers.

8. The method of claim 1 wherein during said first step (b) said pressure conveying device is shut off from each of said pneumatic conveying pipe and said conveying gas supplementary line; and during said second step (c) said charging container and said suction charging device are each shut off from said pneumatic conveying pipe, and said pressure conveying device provides gaseous flow through each of said pneumatic conveying pipe and said conveying gas supplementary line.

9. The method of claim 8 wherein said apparatus further comprises a by-pass pipe providing reversibly closeable gaseous communication between said pressure conveying device and a by-pass pipe connection point in said pneumatic conveying pipe located downstream from said first portion and upstream from said second portion of said pneumatic conveying pipe, gaseous flow through said by-pass pipe being shut off during said first and second steps.

10. The method of claim 9 wherein in said third step (d) gaseous flow from said first portion into said second portion of said pneumatic conveying pipe is shut off, and gaseous flow from said pressure conveying device is allowed to flow through said by-pass line, thereby conveying the fine bulk feed material from said second portion of said pneumatic conveying pipe to said discharge point.

11. An apparatus for pneumatically conveying fine bulk material comprising:
(i) a pneumatic conveying pipe having upstream and downstream portions, said pneumatic conveying pipe having a first portion which is located upstream from a second portion, and a discharge point located further downstream from said second portion;
(ii) a charging container that is in reversibly closeable communication with a charging point of said pneumatic conveying pipe, said charging point being located further upstream from said first portion of said pneumatic conveying pipe;
(iii) a suction conveying device which is in reversibly closeable gaseous communication with a suction point of said pneumatic conveying pipe, said suction point being located between said first and second portions of said pneumatic conveying pipe;
(iv) a pressure conveying device that is in reversibly closeable gaseous communication with a portion of said pneumatic conveying pipe at a point that is further upstream from said charging point;
(v) a conveying gas supplementary line having one of a closed end and a reversibly closeable end, said pressure conveying device being in reversibly closeable gaseous communication with said conveying gas supplementary line; and
(vi) a plurality of shut-off devices providing reversibly closeable gaseous communication from said conveying gas supplementary line into said pneumatic conveying pipe.

12. The apparatus of claim 11 wherein a clog-prone portion of said pneumatic conveying pipe that resides within said second portion of said pneumatic conveying pipe is provided with an increased number of said shut-off devices relative to the rest of said pneumatic conveying pipe, said increased number of shut-off devices reversibly opening and allowing conveying gas to be introduced from said conveying gas supplementary line into said clog-prone portion when a drop in pressure in said dog-prone portion is detected.

13. The apparatus of claim 11 wherein each shut-off device has a gaseous connection point with said pneumatic conveying pipe and a gaseous connection point with said conveying gas supplementary line, each shut-off device having a two-stage design comprising a first stage that is proximate to said pneumatic conveying pipe connection point, and a second stage that is proximate to said conveying gas supplementary line connection point, said first stage reversibly closing when the pressure in said pneumatic conveying pipe at the connection point of the shut-off device therewith is equal to or greater than the pressure in the conveying gas supplementary line at the connection point of the shut-off device therewith, said first stage thereby preventing blowback from said pneumatic conveying pipe into said conveying gas supplementary line through said shut-off device.

14. The apparatus of claim 13 wherein the second stage of said shut-off device is an inlet valve having a pressure presetting for conveying gas from said gas supplementary line into said pneumatic conveying pipe.

15. The apparatus of claim 13 wherein the distance between the gaseous connection points of each adjacent shut-off device with said pneumatic conveying pipe is from 200 mm to 2000 mm.

16. The apparatus of claim 11 further comprising a valve that reversibly shuts off gaseous flow from said pressure conveying device into said conveying gas supplementary line.

17. The apparatus of claim 11 wherein said pneumatic conveying pipe further comprises an in-line valve positioned between said first and second portions of said pneumatic conveying pipe, said in-line valve reversibly shutting off gas flow from said first portion into said second portion of said pneumatic conveying pipe.

18. The apparatus of claim 1 further including a reversibly closeable valve located between said charging container and said charging point of said pneumatic conveying pipe, wherein the reversibly closeable valve provides the reversibly closeable communication between said charging container and said charging point.

* * * * *